Figure 1:
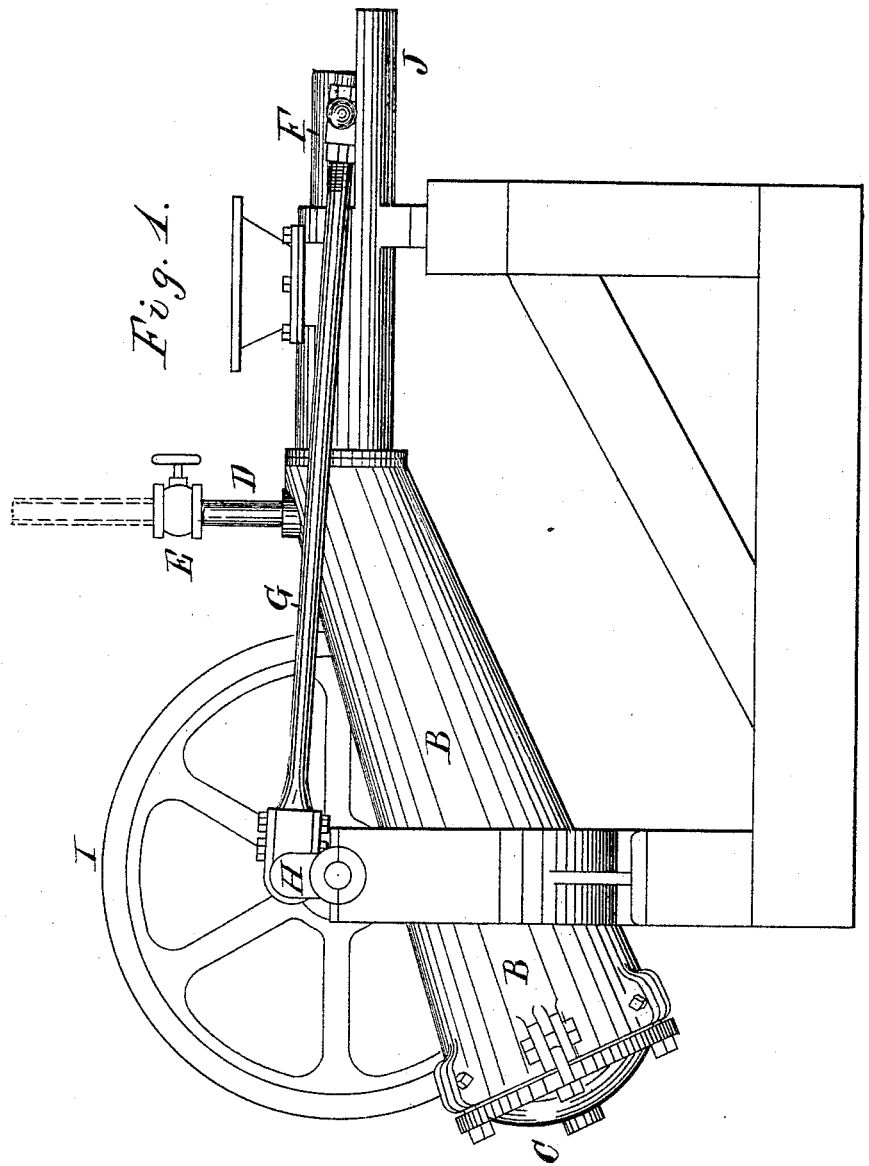

(No Model.)

J. W. HYATT.
PROCESS OF MAKING EXTRACTS.

No. 416,107. Patented Nov. 26, 1889.

Attest:
L. Lee.
F. C. Fischer.

Inventor.
J. W. Hyatt,
per Crane & Miller atty (No Model.)

J. W. HYATT.
PROCESS OF MAKING EXTRACTS.

No. 416,107. Patented Nov. 26, 1889.

Attest:
L. Lee.
F. C. Fischer.

Inventor.
J. W. Hyatt, per
Crane & Miller, attys (No Model.) 6 Sheets—Sheet 4.

J. W. HYATT.
PROCESS OF MAKING EXTRACTS.

No. 416,107. Patented Nov. 26, 1889.

Attest:
L. Lee.
F. C. Fischer.

Inventor.
J. W. Hyatt, per
Crane & Miller, Attys.

(No Model.) 6 Sheets—Sheet 5.

J. W. HYATT.
PROCESS OF MAKING EXTRACTS.

No. 416,107. Patented Nov. 26, 1889.

Attest:
L. Lee.
F. C. Fischer.

Inventor.
J. W. Hyatt, per
Crane & Miller, Attys.

(No Model.)  6 Sheets—Sheet 6.
J. W. HYATT.
PROCESS OF MAKING EXTRACTS.
No. 416,107.  Patented Nov. 26, 1889.
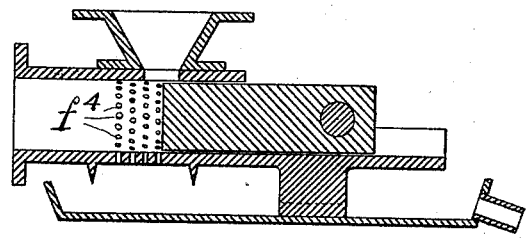
Fig. 7.
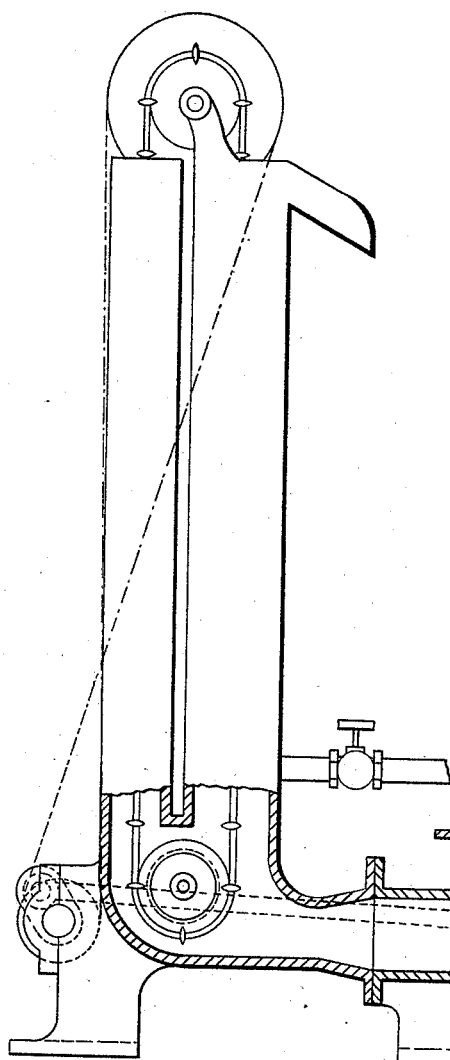
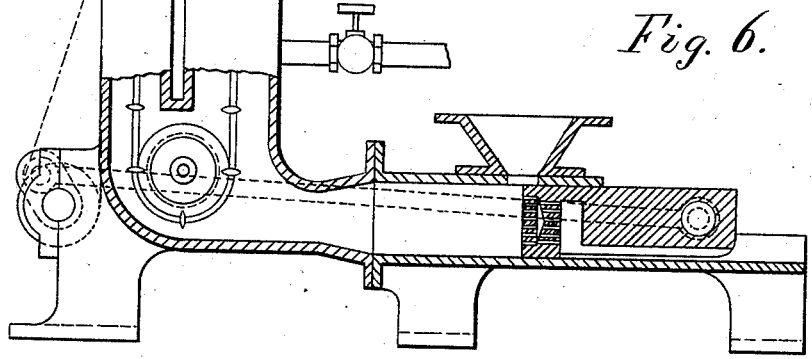
Fig. 6.
Attest:
L. Lee.
F. C. Fischer.
Inventor.
John W. Hyatt, per
Crane & Miller, Attys.

UNITED STATES PATENT OFFICE.

JOHN W. HYATT, OF NEWARK, NEW JERSEY, ASSIGNOR TO THE AMERICAN EXTRACTOR COMPANY, OF SAME PLACE.

PROCESS OF MAKING EXTRACTS.

SPECIFICATION forming part of Letters Patent No. 416,107, dated November 26, 1889.

Application filed August 6, 1889. Serial No. 319,880. (No model.)

*To all whom it may concern:*

Be it known that I, JOHN W. HYATT, a citizen of the United States, residing at Newark, Essex county, New Jersey, have invented certain new and useful Improvements in Process of Making Extracts, fully described and represented in the following specification and the accompanying drawings, forming a part of the same.

This invention relates to a process or method of extracting from disintegrated vegetable materials their liquid or soluble constituents, which consists in progressively forming prescribed quantities of the disintegrated material which is to be operated upon into a plug composed of a series of wads of such material compressed one upon another and closely fitting the bore of a suitable chamber, herein called the "compression-chamber," and by the successive additions of such wads subjecting said plug to compression between a compressing-plunger on one side and a body of liquid, herein called a "liquid anvil" upon the other side of the material operated upon, the liquid products of such compression being discharged either through perforations in the said plunger or in the portions of said cylinder adjoining the place where the plunger concludes its compressing-stroke. The said body of liquid, being either itself closely confined in a reservoir connected with said chamber or held therein under a prescribed degree of pressure, serves as an abutment or anvil, which partially supports the mass of disintegrated material against which the thrust of the plunger is delivered. The disintegrated material operated upon, which, for the sake of brevity, it is convenient to call the "fiber," forms a plug, which closely fits the bore of the cylinder or compression-chamber in which the plunger reciprocates. The said "plug" is composed of bodies of fiber, which are successively fed into the path of the plunger, and which, by the working-strokes thereof, are compressed one upon another in the form of wads. At each working-stroke of the plunger a wad of fiber is added to the adjacent end of the plug, and the plug, being thereby increased in length, is driven bodily forward into the liquid anvil, which partially supports it. Therefore, at each stroke of the plunger a certain portion of the liquid composing the anvil is displaced, and by reason of the pressure which the said liquid is under is compelled to exude through the compressed material composing the plug. The exuding liquid drives before it any liquid which it finds present in the plug, and, by being brought into enforced contact with the soluble constituents of the material operated upon, dissolves and carries those soluble constituents with it through the plug and through passages formed either in the plunger or in the part of the cylinder adjoining the plunger to suitable channels leading to a receiving-tank. The formation of the plug by successive strokes of the plunger is assisted by the frictional hold of the fiber upon the wall of the compression-chamber. The degree of density acquired by the plug depends partly upon the said frictional hold and partly upon the pressure at which the liquid composing the anvil is maintained. The liquid against which the plug is compressed thus performs two functions: that of an anvil against which the fiber is driven by the working-strokes of the compressing-plunger, and also that of a solvent or washing-fluid, which, by being compelled to exude through the plug as an avenue of escape from the pressure which it is under, dissolves or drives before it soluble or liquid matter which it finds therein contained.

The characteristic features of apparatus for carrying out this process embrace a compression-chamber, in which the plug is formed by the compression of successive bodies of fiber; a reciprocating plunger preferably provided with perforations to serve as the outlets for the liquid products of compression; a chamber for containing the liquid composing the liquid anvil, which chamber is a laterally-enlarged continuation of the compression-chamber at the end opposite that in which the compressing-plunger reciprocates and which, irrespective of its form, constitutes the anvil-chamber. The said anvil-chamber, in addition to serving as a container for the liquid anvil, is also the receiver of the refuse composed of the fiber, which during its passage through the compression-chamber has had its natural juice and its soluble constituents extracted. The anvil-chamber, if below the level of the compression-chamber, is provided with a tight-fitting removable door for permitting access to its interior when occasion arises to remove the refuse material. The liquid in the anvil-chamber can be held therein under any desired degree of pressure either by being connected with a service-pipe delivering the liquid under the desired degree of pressure or by being provided with an adjustable yielding valve which may be adjusted to yield whenever the pressure of the liquid rises to a prescribed point in consequence of the projection of the plug into it by the successive strokes of the plunger; or the anvil-chamber may be arranged to extend upward from the compression-chamber to a sufficient height to enable it to contain a column of water affording hydrostatic pressure upon the plug to the extent required to sustain the plug against the working-strokes of the compressing-plunger.

This invention is peculiarly effective for extracting saccharine matter from disintegrated sugar-yielding plants, such as cane, sorghum, or beet-roots. For this purpose water is employed as the liquid anvil; but in making spirituous extracts the liquid employed may be alcohol, naphtha, or any other desired fluid without departing from the invention.

In any case the process is especially advantageous, because the products of compression contain so comparatively small a proportion of the dissolving or washing liquid employed as the liquid anvil.

Figure 2:
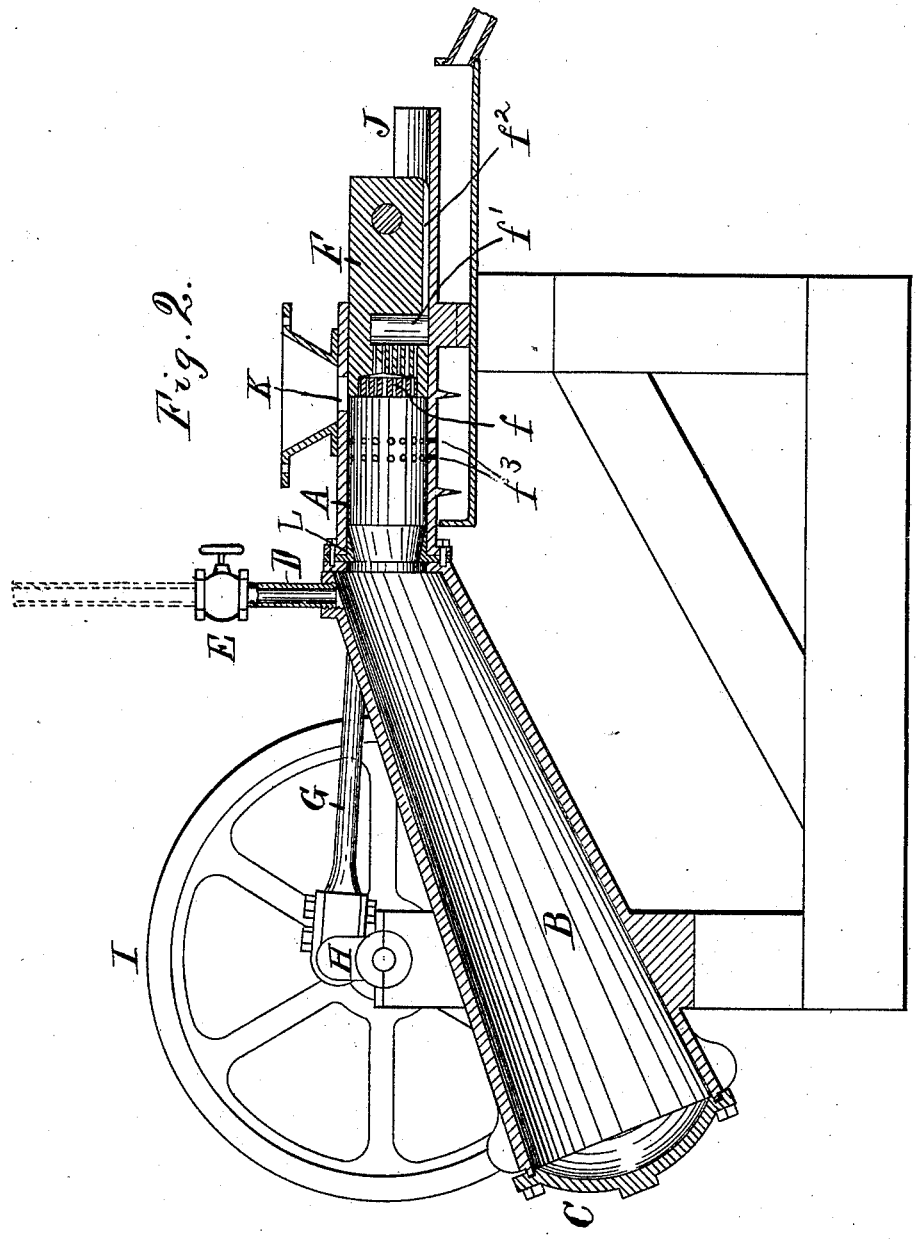
Figure 3:
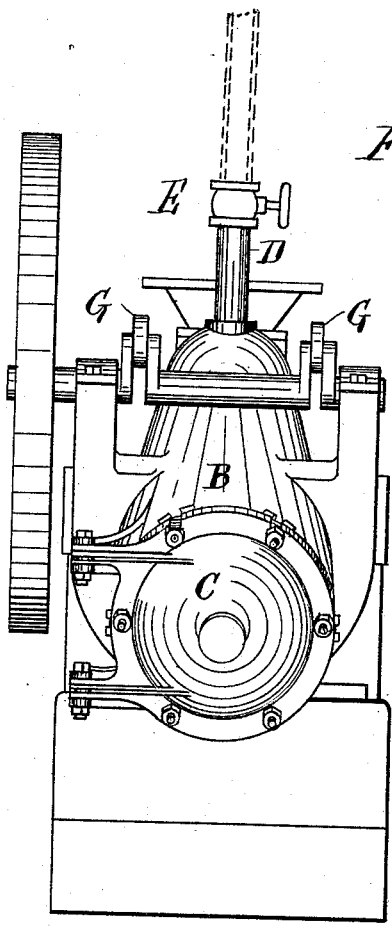
Figure 4:
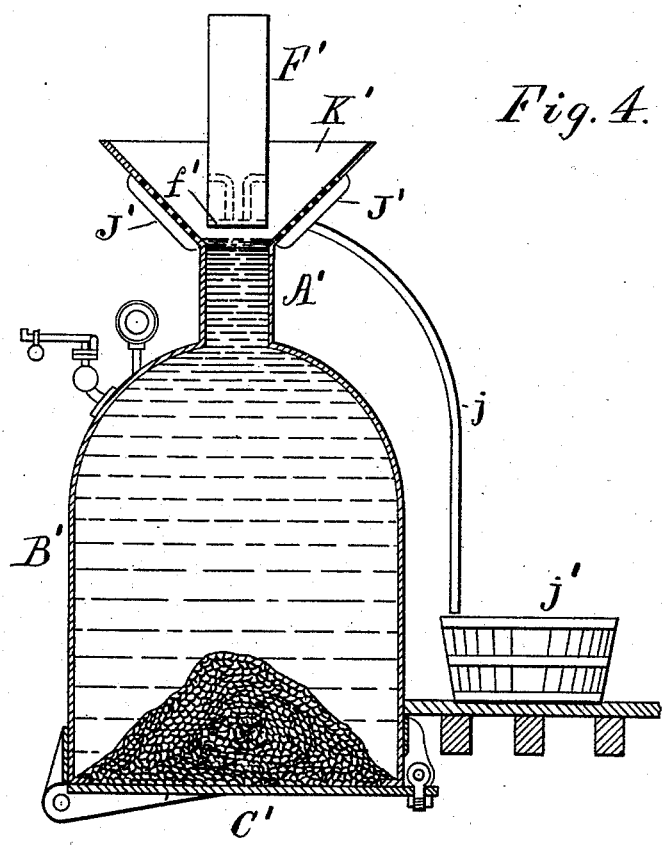
Figure 5:
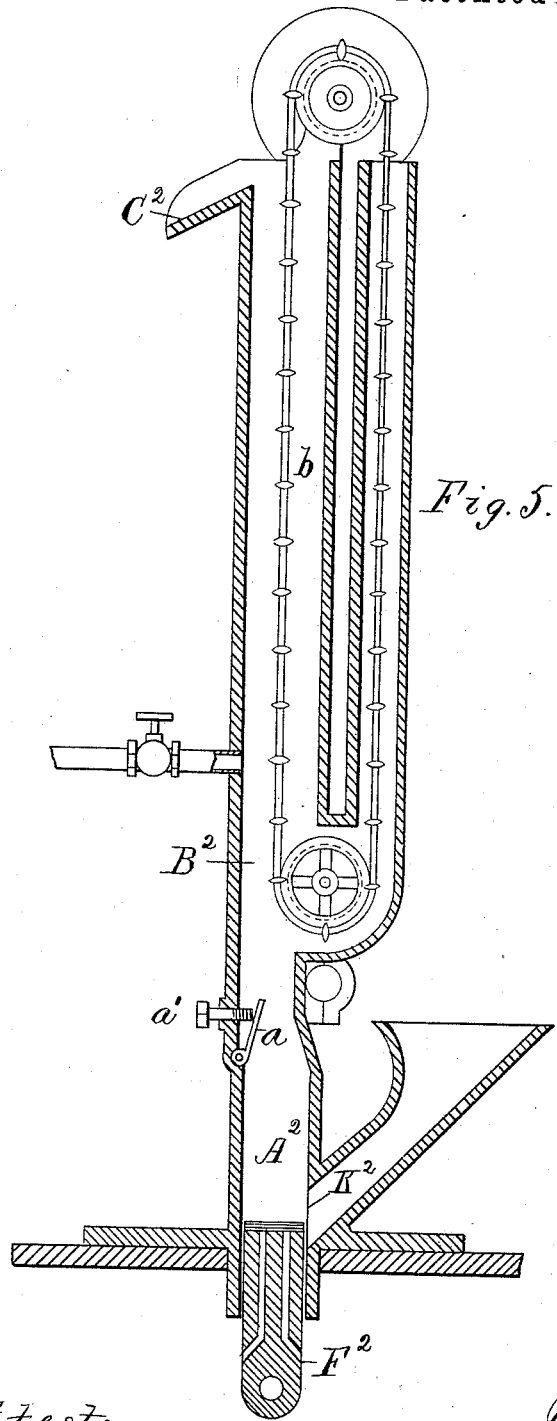

The accompanying drawings, illustrating various forms of apparatus for carrying out the described process, are as follows:

Figures 1, 2, and 3 are respectively a side view, a central vertical section, and an end elevation showing a form of apparatus in which there is employed a horizontal compression-chamber connecting at one end with a downwardly-inclined anvil-chamber provided with a tight-fitting removable door. Fig. 4 is a central vertical section of a form of apparatus employing a vertical compression-chamber arranged at the top of a bottle-shaped anvil-chamber. Fig. 5 is a central vertical section of a form of apparatus employing a vertical compression-chamber arranged at the bottom of an anvil-chamber which is open at the top and which is provided with an interiorly-contained elevator for assisting in the upward movement of the screened fiber to the chute by which it is discharged from the top of the anvil-chamber. Fig. 6 is a side elevation, partly in central vertical section, of a form of apparatus employing a horizontal compression-chamber connected with the curved lower end of an upright anvil-chamber open at its upper end and provided with a discharging-elevator similar to that shown in Fig. 5. Fig. 7 illustrates a modification of the apparatus in which an impervious plunger is employed, and the outlets for discharge of the liquid products of compression consist of perforations in the part of the compression-chamber immediately adjacent to the place where the plunger concludes its working-stroke.

Referring to the drawings, it will be seen that Figs. 1, 2, and 3 represent a compressing apparatus composed of the horizontal cylinder A, to which is connected the laterally-enlarged chamber B, provided at its large end with a removable water-tight door C, and having connected with it a pipe D, for the introduction into the chamber B of the liquid which is to serve as the liquid anvil. The pipe D may be provided with a valve E, and it may be extended vertically upward, as indicated by the dotted lines, to such a height as may enable it to serve as a stand-pipe; or it may be connected with a service-pipe supplying liquid under prescribed pressure. In the end of the cylinder A opposite that connected with the chamber B is the plunger F, to which is imparted a definite range of reciprocating motion by means of a pitman G from the crank H of the rotating balance-wheel I. It is preferred to employ perforations in the plunger as the outlets for the liquid products of compression, and the longitudinal perforations $f$ are symbolic representations of the meshes in the sieves with which the face of the plunger is provided and by which it is enabled to perform the function of a screen as well as that of a compressing device.

The liquid products of compression escape through the perforations $f$ into the transverse channel $f'$ and the longitudinal channel $f^2$, formed in the plunger and along the bottom of the extended lower half of the cylinder A, which constitutes the trough J, from the end of which the liquid products of compression fall into a tank suitably placed to receive them. Outlets for the liquid products of compression may also be provided by forming the holes $f^3$, as shown in Fig. 2, in the part of the cylinder adjacent to the place where the plunger ends its working-stroke. Such holes, however, are not necessary if the pervious plunger is employed.

If an impervious plunger is employed, as illustrated in Fig. 7, it will be necessary to provide the similar holes $f^4$, for the outlet of the liquid products of compression through the wall of the compression-chamber.

A feed-opening K is formed in the upper side of the cylinder A, through which the masses of fiber to be compressed are successively fed into the cylinder in front of the perforated head of the plunger. To assist in the formation of the plug by holding back the fiber, the end of the cylinder adjoining the chamber B may be made tapering. This may be conveniently effected by inserting in that end of the cylinder the flaring tapering nozzle L.

In the form of apparatus represented in Fig. 4 the cylinder A' is erected upon the top of the anvil-chamber B', which is provided at the bottom with a removable water-tight door C'. At its upper end the cylinder A' is provided with a flaring mouth K', which constitutes the hopper for feeding in the fiber which is to be compressed. In this case the vertically-reciprocating plunger F' is wholly withdrawn from the cylinder A' at every upward stroke, and during its downward or working stroke the perforated head $f'$ of the plunger drives into the upper end of the cylinder the charge of fiber which may have been fed into the hopper K'. The convergent walls of the hopper K' are perforated, as shown, and the perforated portion of the hopper is provided with a jacket J', to which is attached a discharge-pipe $j$.

The liquid products of compression compelled to exude through the mass of compressed fiber and through the perforations of the plunger at each downward or working stroke thereof flow into the jacket J', from which they are conducted by the pipe $j$ to the receiving-tank $j'$.

In the modification illustrated in Fig 5 hydrostatic pressure is employed to enable the liquid anvil to oppose the necessary resistance to the upward movement of the plug of fiber, which in this case is subjected to compression by the upward stroke of the plunger.

It will be seen that the plunger $F^2$ reciprocates in the lower end of the cylinder $A^2$, alternately opening and closing the lateral feed-opening $K^2$. The upper end of the cylinder $A^2$ is made convergent and may be provided with an adjustable valve $a$, which, by means of a set-screw $a'$, can be held in position to more or less obstruct the upward movement of the fiber during the initial formation of the plug, after the formation of which the valve can be opened to permit the free upward movement of the refuse material into the chamber $B^2$, provided, preferably, with an elevator $b$ for loosening and assisting in the elevation of the refuse material to the top of the chamber $B^2$, where it is discharged into the chute $C^2$.

In starting this apparatus the chamber $B^2$ is not filled with liquid until the plunger has made a sufficient number of strokes to collect and form a plug of such density that its frictional hold upon the wall of the cylinder will enable it to sustain the weight of the column of liquid above it.

I do not herein claim the means shown and described for carrying out my new process, the same forming the subject of other applications—Serial No. 300,233, filed February 18, 1889, and No. 323,317, filed September 7, 1889.

What is claimed as the invention is—

The herein-described method of extracting from disintegrated vegetable materials their liquid or soluble constituents, which consists in progressively compacting the material operated upon into a plug closely fitting the bore of a suitable chamber and therein progressively subjecting said material to compression between a compressing-plunger and a liquid anvil in proximity to suitable outlets for the discharge of the liquid products of such compression.

In testimony whereof I have hereunto set my hand in the presence of two subscribing witnesses.

JOHN W. HYATT.

Witnesses:
 F. C. FISCHER,
 THOS. S. CRANE.